United States Patent [19]

Peters

[11] Patent Number: 4,610,574

[45] Date of Patent: Sep. 9, 1986

[54] CATALYST FEEDING SYSTEM

[75] Inventor: Edwin F. Peters, Winfield, Ill.

[73] Assignee: Amoco Corporation, Chicago, Ill.

[21] Appl. No.: 692,268

[22] Filed: Jan. 17, 1985

Related U.S. Application Data

[60] Division of Ser. No. 615,186, May 30, 1984, abandoned, which is a continuation of Ser. No. 407,848, Aug. 13, 1982, abandoned.

[51] Int. Cl.$^4$ .................. B65G 53/30; B01J 8/08
[52] U.S. Cl. .................. 406/50; 406/135; 406/146; 422/131; 422/232; 422/234; 366/137
[58] Field of Search ............... 422/131, 232, 234; 406/63, 136, 50, 137, 146, 135; 366/136, 137, 150

[56] References Cited

U.S. PATENT DOCUMENTS

| | | | |
|---|---|---|---|
| 2,005,800 | 6/1935 | O'Boyle | 406/136 |
| 3,291,536 | 12/1966 | Smoot | 406/50 |
| 3,347,637 | 10/1967 | Price et al. | 422/131 |
| 3,982,789 | 9/1976 | Funk | 406/63 |
| 4,017,270 | 4/1977 | Funk et al. | 406/63 |
| 4,029,362 | 6/1977 | Kortenbusch | 406/50 |
| 4,123,601 | 10/1978 | Kellum et al. | 422/234 |
| 4,415,296 | 11/1983 | Funk | 406/63 |

Primary Examiner—David L. Lacey
Attorney, Agent, or Firm—Scott H. Brown; Fred E. Hook

[57] ABSTRACT

An apparatus is provided for introducing a mixture of dry catalyst and a hydrocarbon liquid into a polymerization reactor vessel. The apparatus comprises a enclosed mixing tank with rotating mixing blades and a rotatable shot valve spaced below the mixing tank. The shot valve can be rotated from a first position in communication with an opening in the lower portion of the mixing tank to a second position in communication with a hydrocarbon feed conduit that provides hydrocarbon liquid to the polymerization reactor vessel. A bypass conduit is provided for introducing hydrocarbon liquid from the hydrocarbon feed conduit into the mixing tank wherein the interior of the mixing tank is maintained at the same pressure as the hydrocarbon feed conduit.

5 Claims, 3 Drawing Figures

CATALYST FEEDING SYSTEM

This is a divisional application of Ser. No. 615,186, filed May 30, 1984, and now abandoned which was a continuation of U.S. Ser. No. 407,848, filed Aug. 13, 1982, now abandoned.

BACKGROUND OF THE INVENTION

1. Field of the Invention

The present invention relates to a catalyst feeding system for polymerization proceses and, more particularly, to such a system in which catalyst is mixed with a hydrocarbon fluid in a tank to form a catalyst mud prior to introduction into the polymerization system.

2. Setting of the Invention

In some vapor phase or slurry phase olefin polymerizations a polymerization catalyst, such as $CrO_3$-$SiO_2$, $CrO_3$-$SiO_2$-$Al_2O_3$, $TiCl_3$, $TiCl_3$-$MgCl_2$ and the like, is usually introduced at timed intervals into one or more polymerization zones within a reactor vessel. In the reactor vessel the catalyst and a quench liquid, such as a light hydrocarbon, are introduced directly into and onto the stirred and/or fluidized bed for forming the desired polymers. In one type of polymerization system the catalyst and a hydrocarbon, such as hexane for propylene polymerization or isobutane for ethylene polymerization, are introduced into a mixing tank, which can be equipped with rotating mixing blades. The catalyst and the hydrocarbon are mixed at a high rate of speed to form a fluid-like catalyst slurry which is then introduced through a ball or shot valve into a catalyst dilution vessel and then into the reactor vessel. If the mixing speed is too slow the catalyst can become compacted in the lower portion of the tank and often will not flow into the shot valve. If the mixing speed is too fast the catalyst may be pulverized, which then results in the production of undesirable polymer fines in the reactor vessel. Also, in these systems the catalyst slurry may not be introduced into the dilution tank or the reactor vessel in exact amounts each time because the catalyst slurry tends to not feed into the ball or shot valve in a predictable manner.

In certain situations, it is desirable to react the catalyst with a suitable olefin containing hydrocarbon to form a catalyst-polymer-curd for introduction into the reactor vessel. The curd makes a higher activity catalyst because of better promoter-catalyst contact in the presence of liquid phase olefins. Also, temperature control in the reactor vessel is better because the catalyst is bathed in hydrocarbon when it is initially formed and is in a high activity state. To produce the catalyst-polymer-curd, additional equipment is usually required to be installed in the catalyst feed system, which then adds to the installation cost and maintenance expenses of the total system.

There exists a need for a polymerization catalyst feed system which (a) reduces or eliminates pulverization of the catalyst, (b) can accurately measure and feed a desired amount of catalyst into a dilution tank or the reactor vessel, and (c) has the flexibility to form a catalyst-polymer-curd without the need for additional equipment.

SUMMARY OF THE INVENTION

The present invention provides a catalyst feeding system for polymerization systems wherein the catalyst and a hydrocarbon fluid are introduced into a mixing tank. The catalyst and hydrocarbon fluid are mixed in the tank in such manner that the catalyst is maintained in the lower portion of the tank and the catalyst is expanded by about 15%-60% by volume to form a catalyst mud. The catalyst mud is then introduced into the polymerization system. The catalyst can also be mixed with an olefin-hydrocarbon fluid in the mixing tank to form a catalyst-polymer-curd which is then introduced into the polymerization system. The mixing is in such manner that essentially no pulverization of the catalyst occurs and the produced catalyst mud can be fed in exact amounts into the polymerization system.

DETAILED DESCRIPTION OF THE PREFERRED EMBODIMENTS

The present invention is a novel catalyst feeding system for use in polymerization systems wherein the catalyst and a hydrocarbon fluid are introduced into a mixing tank and are mixed in such manner that the catalyst is maintained in the lower portion of the tank and the catalyst is expanded by about 15%-60% in volume to form a catalyst mud. The catalyst mud is then introduced by settling and/or being drawn into a feeding valve by a pump through a timed-opening metering valve into the polymerization system. The catalyst mud is more dense and homogeneous than the catalyst slurry produced by the prior art and tends to feed in a more predictable manner into the metering valve than the catalyst slurry.

In an alternate embodiment, the dry catalyst and an olefin-hydrocarbon fluid are introduced into the tank and are mixed in such manner that the catalyst is maintained in the lower portion of the tank and the catalyst reacts with the olefin-hydrocarbon fluid to form a catalyst-polymer-curd. During the formation of the catalyst-polymer-curd the catalyst should be kept in complete suspension for the necessary even heating transfer to avoid local heating. This catalyst-polymer-curd is then introduced through the metering valve into the polymerization system. The required mixing of the hydrocarbon and catalyst can be accomplished by slowly rotating, uplifting blades which will not pulverize the catalyst.

Figure 1:
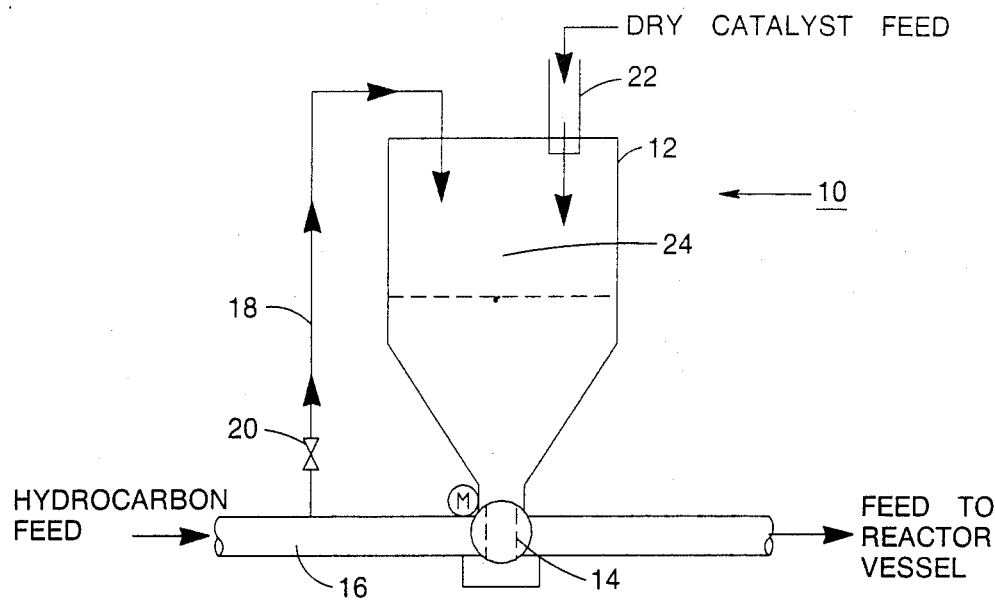
FIG. 1 is a semi-diagrammatic representation of one embodiment of a catalyst feeding system of the present invention.

To aid in the better understanding of the present invention, the following discussion will be directed to the accompanying drawings. As shown in FIG. 1, reference character 10 generally indicates a catalyst feed system for use in polymerization systems which has a mixing tank 12 which is provided with a metering valve 14 connected to a lower portion thereof. The tank 12 may be in any operative configuration and the lower portion thereof may be tapered, conical, sloping or flat as dictated by field requirements with at least one opening therein in communication with the metering valve 14. The metering valve 14 is preferably a shot valve which has a bore therethrough to receive a given amount of material, such as catalyst, from the lower portion of the tank 12. The metering valve 14 is rotated by a motor mechanism M to rotate the ball of the valve 14 from a vertical position to a horizontal position and then back at preset time increments, such as every ½ to 2 minutes. A conduit 16, which carries a hydrocarbon fluid feed such as hexane or isobutane from a hydrocarbon fluid source to the reactor vessel (not shown), is connected to the metering valve 14 so that when the ball of the metering valve 14 is rotated into a horizontal position the bore through the ball is in coaxial alignment with the conduit 16 to allow the flow of hydrocarbon fluid therein to push the load of catalyst from the valve 14 through the conduit 16 and to the polymerization system. A bypass line 18 in communication with the line 16 through a valve 20 extends into communication with the tank 12.

In the operation of the catalyst feeding system 10, hydrocarbon fluid flows through the line 16 to the metering valve 14, which is rotated in such manner to block the passage of the hydrocarbon fluid feed. Hydrocarbon fluid pases through the valve 20 and through the line 18 into the interior of the tank 12 and maintains the interior of the tank 12 at a pressure equal to the hydrocarbon fluid feed pressure. Dry catalyst is introduced through the line 22 into the liquid filled tank 12 to mix with the hydrocarbon and to form a catalyst mud. The catalyst mud settles into the lower portion of the tank 12 as shown by the dashed line in FIGS. 1-3. At preset time increments, such as between one-half and two minutes each, the metering valve 14 is rotated 90°, which allows a predetermined amount of catalyst mud to be pushed with a preset amount of hydrocarbon fluid feed to a dilution tank or the downstream reactor vessel. The valve 14 quickly then recycles to block the flow of hydrocarbon fluid through the line 16 and another increment of catalyst mud falls into the bore in the ball of the metering valve 14.

Figure 2:
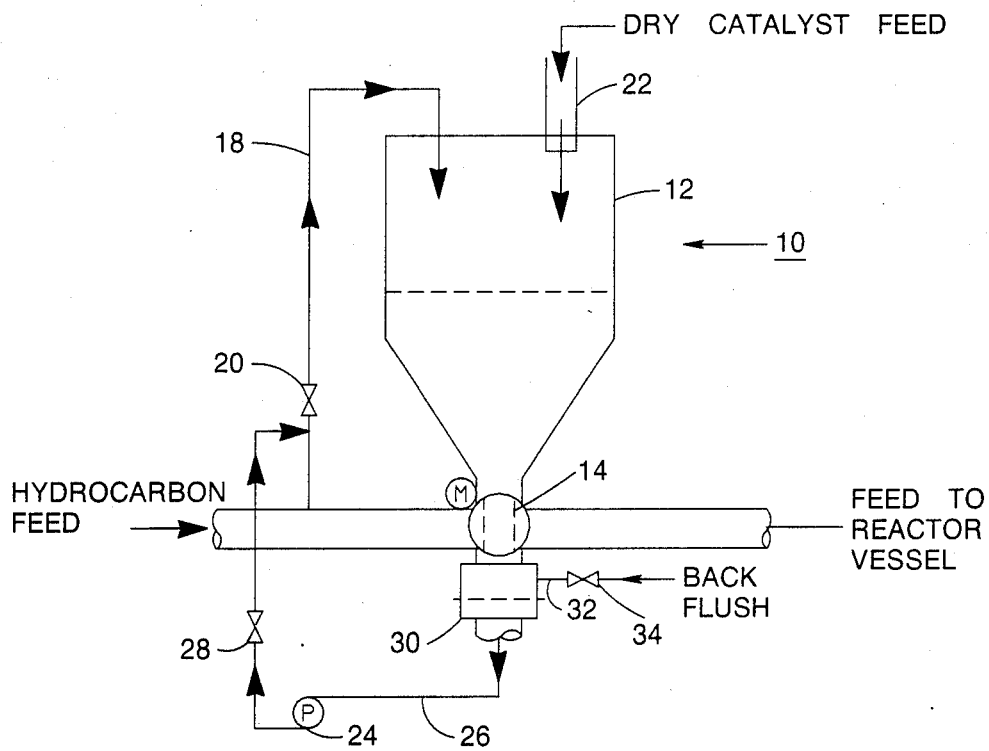
FIGS. 2 and 3 are semi-diagrammatic representations of alternate embodiments of the present invention.

An alternate embodiment of the catalyst feeding system 10 is shown in FIG. 2 wherein the catalyst mud is drawn into the metering valve 14 by the pump 24. The operation of the embodiment shown in FIG. 2 is approximately the same as the previously described embodiment. The inlet of a pump 24 is in communication through a line 26 with the underside of the bore through the ball of the metering valve 14. The outlet of the pump 24 is in communication through a valve 28 with the bypass line 18. A metal frit filter assembly 30 is provided in the line 26 immediately adjacent the valve 14 to prevent catalyst from being forced through the valve 14 and into the line 26. A hydrocarbon fluid line 32 is connected to the filter assembly 30 through a valve 34 to provide means for back-flushing the filter 30. The suction provided by pump 24 ensures proper feeding, as well as obtaining a predetermined and desired density of catalyst mud in the metering valve 14. When the valve 14 is rotated to allow the passage of the hydrocarbon fluid feed through line 16 and to push the catalyst mud to the dilution vessel an additional amount of hydrocarbon is introduced through the valve 20 and the line 18 into the interior of the tank 12. The tapered vessel 12, as shown in FIGS. 1 and 2, is preferred for use with $CrO_3$-$SiO_2$ and other similar supported transition metal compound catalysts. The angle of the taper for the versal 12 can be between 30° to about 80°, with approximately 60° being preferred.

Figure 3:
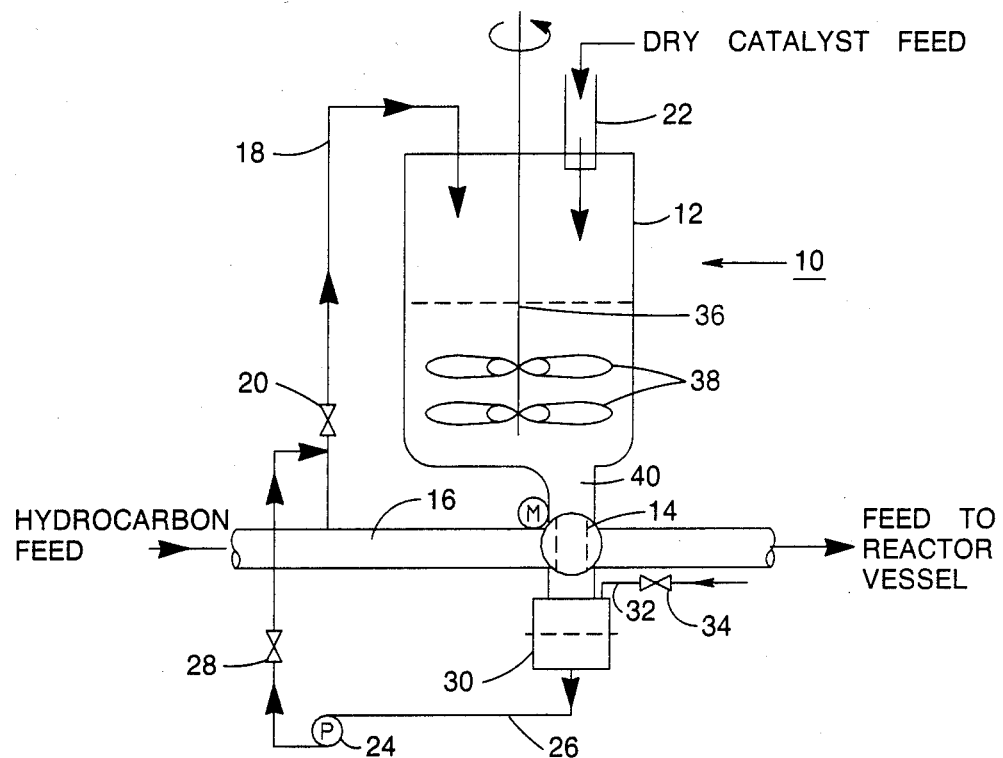

FIG. 3 illustrates an alternate embodiment of the present invention for use with $TiCl_3$ or other similar catalysts. In this embodiment a vertical shaft 36 extends into the interior of the tank 12 and is operatively connected at an upper end to a motor (not shown). A plurality of elongated mixing blades 38 are connected to the shaft 36 and are provided to slowly stir and mix the introduced catalyst and the hydrocarbon to form the catalyst mud. The blades 38 are rotated at between about 1 to about 90 RPM, with the exact RPM being dictated by reactor vessal shape and size and type of catalyst. A lower opening 40 in the horizontal bottom panel of the vessel 12 is offset to one side and has been found to provide the most accurate feeding of the catalysts which are stirred by the blades 38.

Benefits of the present invention can be shown by the following examples. The procedures used for Examples 1-7 included the following:

(a) the system was cleaned, dried and flushed with $N_2$;
(b) 200-300 mls of purified hexane was charged into the system with $N_2$;
(c) for tests that used stirring blades in the mixing tank, the blades were equipped with a 30° pitch and were rotated between 30-60 RPM in a direction to expand or uplift the catalyst;
(d) the catalyst was charged into the vessel;
(e) the remaining volume of the vessel was filled with hexane;
(f) the stirring speed was reduced to between 12-41 RPM;
(g) the shot valve was activated at predetermined times;
(h) between 10-20 shots of catalyst mud were taken; and
(i) the collected shots were dried and weighed.

The accompanying Table I shows the results of Examples 1-7. It is important to note that the reproducibility of the Examples was better than 99%, which indicates the reliability and accuracy of the present invention.

TABLE 1

| EXAMPLE | 1 | 2 | 3 | 4* |
|---|---|---|---|---|
| Feeder Type | FIG. 1 | FIG. 1 | FIG. 1 | FIG. 2 |
| Volume, mls | 1000 | 1000 | 1000 | 1000 |
| Charge | | | | |
| Hexane, mls | 750 | 750 | 750 | 750 |
| $CrO_3$—$SiO_2$, q. | 85.8 | 70.8 | 64.0 | 98.6 |
| Ball Shot Valve | | | | |
| Size, in. | 0.50 | 0.50 | 0.50 | 0.50 |
| Length, cm | 1.84 | 1.84 | 1.84 | 1.84 |
| I.D. cm | 1.10 | 1.10 | 1.10 | 1.10 |
| Volume, $Cm^3$ | 1.75 | 1.75 | 1.75 | 1.75 |
| Feeding Cycle | | | | |
| Shot Fill Time, min. | 3 | 3 | 2 | 1 |
| Shot Flush Time, sec. | 3 | 3 | 3 | 3 |
| Shot Flushing Vol. mls. | 60 | 60 | 60 | 60 |
| No. Shots Delivered | 120 | 60 | 110 | 60 |
| Shot Size, g. | 0.3431 ± 1.43% | 0.3229 ± 1.49% | 0.3453 ± 1.09% | 0.3790 ± 0.92% |

TABLE 1-continued

| Feeding Cycle | | | | |
|---|---|---|---|---|
| Shot Fill Time, min. | 3 | 2 | 0.5 | 0.25 |
| Shot Flush Time, sec. | 3 | 3 | 3 | 3 |
| Shot Flushing Vol. mls. | 60 | 60 | 60 | 60 |
| No. Shots Delivered | 125 | 60 | 20 | 60 |
| Shot Size, g. | 0.3508 ± 0.68% | 0.3139 ± 0.62% | 0.3342 ± 0.57% | 0.3785 ± 0.56% |
| Feeding Cycle | | | | |
| Shot Fill Time, min. | — | 1 | — | 0.17 |
| Shot Flush Time, sec. | — | 3 | — | 3 |
| Shot Flushing Vol. mls. | — | 60 | — | 60 |
| Shot Size, g. | — | 0.3159 ± 0.17% | — | 0.3629 ± 1.26% |

*Force filled shot.

| EXAMPLE | 5 | 6 | 7* |
|---|---|---|---|
| Feeder Type | FIG. 3 | FIG. 3 | FIG. 3 |
| Volume, mls | 1130 | 1130 | 1130 |
| Charge | | | |
| Hexane, mls | To Fill | To Fill | To Fill |
| ME-45 Cat, g | 33 No. Syloid | 136 with 30# Syloid | Solvay PP Cat. |
| Ball Shot Valve | | | |
| Size, in. | 0.50 | 0.50 | 0.50 |
| Length, cm | 1.84 | 1.84 | 1.84 |
| I.D. cm | 1.10 | 1.10 | 1.10 |
| Volume, Cm³ | 1.75 | 1.75 | 1.75 |
| Feeding Cycle | | | |
| Shot Fill Time, min. | 3 | 3 | 2 |
| Shot Flush Time, sec. | 3 | 3 | 3 |
| Shot Flushing Vol. mls. | 60 | 60 | 70 to 80 |
| No. Shots Delivered | 108 | 206 | 36 |
| Shot Size, g. | 0.550 ± 1.26% | 0.748 ± 3.51% | 0.875 ± 5.6% |
| Stirrer, RPM | 12 | 12 | 12 |

*Micro Pure System Ultrasonics instrument, 3 MHz detector, No. MPA-1700, connected to recorder measured and recorded each shot of catalyst showing good reproducibility.

Among the benefits of the present invention are that the catalyst mud in the tank 12 is maintained in a condition which is not too loose or dense to cause feeding problems, so it readily settles into the metering valve 14. The extent to which the catalyst is expanded from its settled volume to the expanded volume is determined by the extent of mixing. Further, the mixing is so gentle so as not to pulverize the catalyst. The catalyst mud is washed or drawn into the line 16 and to the dilution vessel or the downstream reactor vessel with a minimum amount of virgin hydrocarbon, which is the same as used in the reactor for temperature control. In gas phase systems this is considered quench liquid or in a slurry process a catalyst and polymer particulate suspending medium.

Reactor recycle fluids containing promoters, H₂ and olefins, can be introduced into the interior of the tank 12 to force the catalyst mud from the valve 14 into the line 16 if done in a manner with controlled temperatures and pressures to control the polymerization. Use of reactor recycle fluid greatly reduces the virgin hydrocarbon requirement which can result in an appreciable economic savings and also greatly enhances the catalyst yield and rate by reducing the amount of inferior purity virgin solvent charged to the system. Also, the amount of hydrocarbon purification required is greatly reduced.

If desired, olefin hydrocarbons can be introduced into the interior of the tank 12 to react with the catalyst in a prepolymerization process to form a catalyst-polymer-curd. The residency time of the catalyst and the olefin hydrocarbon is sufficient to create one to five pounds of polymer per pound of catalyst. The curd can be stirred and expanded by the rotating blades 38. The curd is introduced into the shot valve 14, as shown in FIG. 1, or by suction, as shown by FIG. 2 or 3. The formation of the catalyst-polymer-curd is possible within the present invention without the need of any additional equipment and leads to the production of larger polymer particulate in the reactor which is highly desirable. Further, the polymer molecular weight distribution can be raised by varying the amount of polymerization in the curd forming process with respect to the amount of polymer it produces in the reactor at a high temperature. In other words, one can build a high molecular weight "tail" into the polymer produced.

Wherein the present invention has been described in particular relation to the discussions and drawings attached hereto, it should be understood that other and further modifications, apart from those shown or suggested herein, may be made within the scope and spirit of this invention.

I claim:

1. An apparatus for transferring a known quantity of a mixture of dry catalyst and a hydrocarbon liquid, comprising:

a hydrocarbon feed conduit;

an enclosed mixing tank having an outlet in a lower portion thereof and connected to said hydrocarbon feed conduit;

means for introducing dry catalyst into the interior of the mixing tank;

a bypass conduit in communication with the hydrocarbon feed conduit upstream of the mixing tank and in communication with the interior of the mixing tank so that the interior of the mixing tank is maintained at the pressure of a hydrocarbon liquid flowing through the hydrocarbon feed conduit;

a shot valve spaced below the mixing tank and rotatable from a first position in communication with the outlet in the mixing tank to a second position in communication with the hydrocarbon feed conduit;

means for rotating the shot valve from the first position to the second position and back; and means within the mixing tank for mixing dry catalyst and hydrocarbon liquid.

2. The apparatus of claim 1 wherein the outlet in the mixing tank is offset from the central vertical axis thereof.

3. The apparatus of claim 1 wherein the means for mixing the dry catalyst and the hydrocarbon liquid comprises rotatably mounted blades.

4. The apparatus of claim 1 wherein the shot valve is constructed to be rotatable from a first position coaxially vertically aligned with the outlet in the mixing tank to a second position coaxially horizontally aligned with the hydrocarbon feed conduit.

5. The apparatus of claim 1 and including a filter mounted across an opening in a lower portion of the shot valve, and a third conduit in communication between the opening in the lower portion of the shot valve and the bypass conduit, wherein when the shot valve is in the first position, hydrocarbon liquid passing through the opening is passed back into the interior of the mixing tank.

* * * * *